United States Patent
Chobot

(10) Patent No.: US 9,554,445 B2
(45) Date of Patent: Jan. 24, 2017

(54) COLOR POINT AND/OR LUMEN OUTPUT CORRECTION DEVICE, LIGHTING SYSTEM WITH COLOR POINT AND/OR LUMEN OUTPUT CORRECTION, LIGHTING DEVICE, AND METHODS OF LIGHTING

(71) Applicant: CREE, INC., Durham, NC (US)

(72) Inventor: Joseph P. Chobot, Morrisville, NC (US)

(73) Assignee: Cree, Inc., Durham, NC (US)

(*) Notice: Subject to any disclaimer, the term of this patent is extended or adjusted under 35 U.S.C. 154(b) by 572 days.

(21) Appl. No.: 13/723,952

(22) Filed: Dec. 21, 2012

(65) Prior Publication Data

US 2013/0200806 A1 Aug. 8, 2013

Related U.S. Application Data

(60) Provisional application No. 61/594,764, filed on Feb. 3, 2012.

(51) Int. Cl.
*H05B 37/02* (2006.01)
*H05B 33/08* (2006.01)
*F21V 23/04* (2006.01)

(52) U.S. Cl.
CPC ........... *H05B 37/02* (2013.01); *F21V 23/0464* (2013.01); *H05B 33/0869* (2013.01);
(Continued)

(58) Field of Classification Search
CPC ... H05B 37/02; H05B 37/029; H05B 33/0803; H05B 33/0815; H05B 33/0869; H05B 33/086; H05B 33/0857; H05B 41/325; Y02B 20/14; Y02B 20/202
(Continued)

(56) References Cited

U.S. PATENT DOCUMENTS 7,482,567 B2  1/2009 Hoelen et al.
7,942,556 B2  5/2011 Harbers et al.
(Continued)

FOREIGN PATENT DOCUMENTS

EP   2 560 463      2/2013
WO   2009/044354    4/2009
WO   2009/150562    12/2009

OTHER PUBLICATIONS

International Search Report and Written Opinion from a corresponding international patent application bearing a mailing date of May 6, 2013.

*Primary Examiner* — Haissa Philogene
(74) *Attorney, Agent, or Firm* — Burr & Brown, PLLC

(57) ABSTRACT

A portable device comprising a light detector, a correction calculator and a correction output element. In some aspects, (1) correction (and/or adjustment) is of color point, lumen output, or both, (2) the portable device is a smart phone or a computing device, and/or (3) a wireless correction signal is transmitted and received. Lighting system, comprising a light source, and a portable device that comprises a light detector, a correction calculator, and a correction output element. Lighting device comprising a light source and a receiver. A method comprising detecting light with a light detector of a portable device, generating a correction signal, and outputting the correction signal with a correction output element of the portable device. Method comprising placing a portable device in a calibration location, illuminating a lighting device, and detecting light emitted from the lighting device with a light detector of the portable device that has a correction calculator.

24 Claims, 3 Drawing Sheets

Figure 1A:
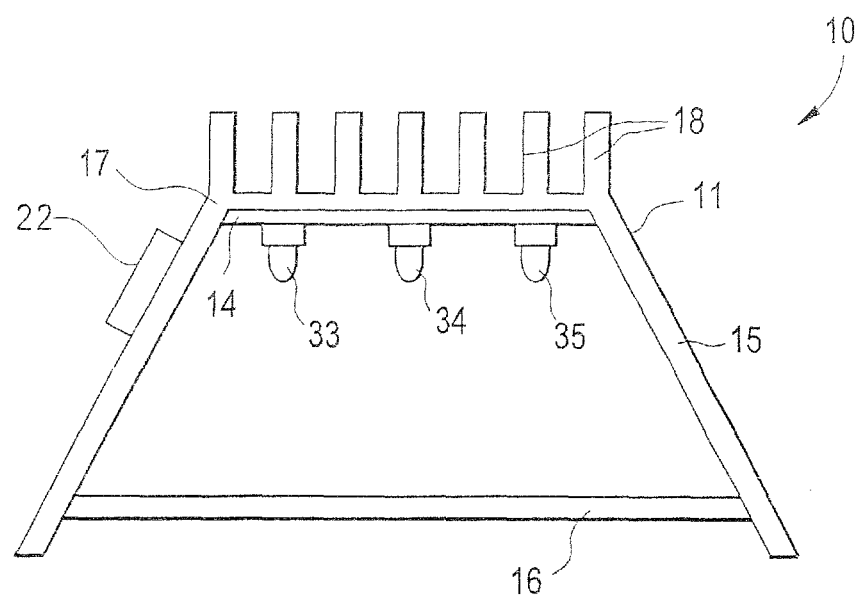

(52) U.S. Cl.
CPC ..... *H05B 37/0218* (2013.01); *H05B 37/0272* (2013.01); *Y02B 20/46* (2013.01); *Y02B 20/48* (2013.01)

(58) Field of Classification Search
USPC ............ 315/185 R, 291, 294, 307, 308, 312, 360,315/149–159
See application file for complete search history.

(56) References Cited

U.S. PATENT DOCUMENTS

| | | | |
|---|---|---|---|
| 8,330,394 B2* | 12/2012 | Custodis ....................... | 315/312 |
| 8,442,691 B2* | 5/2013 | Van Der Veen ... | H05B 37/0254 |
| | | | 315/312 |
| 8,508,116 B2* | 8/2013 | Negley ..................... | F21K 9/00 |
| | | | 313/501 |
| 8,796,948 B2* | 8/2014 | Weaver et al. ............... | 315/294 |
| 8,847,513 B2* | 9/2014 | Van De Ven ........ | H05B 33/086 |
| | | | 315/151 |
| 8,901,850 B2* | 12/2014 | Maxik ............... | H05B 33/0872 |
| | | | 315/297 |
| 8,952,626 B2* | 2/2015 | Huang ................ | H05B 37/029 |
| | | | 315/158 |
| 9,217,542 B2* | 12/2015 | Pickard ................... | F21K 9/135 |
| 2005/0127381 A1 | 6/2005 | Vitta et al. | |
| 2007/0045524 A1 | 3/2007 | Rains, Jr. et al. | |
| 2008/0303918 A1* | 12/2008 | Keithley .................. | 348/223.1 |
| 2011/0109445 A1 | 5/2011 | Weaver et al. | |
| 2011/0284730 A1 | 11/2011 | Sturdevant | |
| 2013/0043797 A1 | 2/2013 | Huang et al. | |

* cited by examiner

COLOR POINT AND/OR LUMEN OUTPUT CORRECTION DEVICE, LIGHTING SYSTEM WITH COLOR POINT AND/OR LUMEN OUTPUT CORRECTION, LIGHTING DEVICE, AND METHODS OF LIGHTING

CROSS-REFERENCE TO RELATED APPLICATIONS

This application claims the benefit of U.S. Provisional Patent Application No. 61/594,764, filed Feb. 3, 2012, the entirety of which is incorporated herein by reference as if set forth in its entirety.

FIELD OF THE INVENTIVE SUBJECT MATTER

In some aspects, the present inventive subject matter is directed to a lighting device, e.g., a device for general illumination. In some aspects, the present inventive subject matter is directed to a lighting system that comprises a lighting device and a device for monitoring and/or correcting (1) the color point of light emitted by the lighting device, and/or (2) the lumen output of the lighting device. In some aspects, the present inventive subject matter is directed to a device for monitoring and/or correcting the color point of light emitted by a lighting device and/or the lumen output of the lighting device. In some aspects, the present inventive subject matter is directed to a method of lighting that comprises monitoring and/or correcting the color point of light emitted by a lighting device and/or the lumen output of the lighting device. In some aspects, the present inventive subject matter is directed to a method for calibrating a device for monitoring and/or correcting the color point of light emitted by a lighting device and/or the lumen output of the lighting device.

BACKGROUND

There is an ongoing effort to develop systems that are more energy-efficient. A large proportion (some estimates are as high as twenty-five percent) of the electricity generated in the United States each year goes to lighting, a large portion of which is general illumination (e.g., downlights, flood lights, spotlights and other general residential or commercial illumination products). Accordingly, there is an ongoing need to provide lighting that is more energy-efficient.

Solid state light emitters (e.g., light emitting diodes) are receiving much attention due to their energy efficiency. It is well known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes than incandescent lights (e.g., fluorescent bulbs typically have lifetimes of 10,000-20,000 hours), but provide less favorable color reproduction. The typical lifetime of conventional fixtures is about 20 years, corresponding to a light-producing device usage of at least about 44,000 hours (based on usage of 6 hours per day for 20 years). Where the light-producing device lifetime of the light emitter is less than the lifetime of the fixture, the need for periodic change-outs is presented. The impact of the need to replace light emitters is particularly pronounced where access is difficult (e.g., vaulted ceilings, bridges, high buildings, highway tunnels) and/or where change-out costs are extremely high.

General illumination devices are typically rated in terms of their color reproduction. Color reproduction is typically measured using the Color Rendering Index (CRI Ra). CRI Ra is a modified average of the relative measurements of how the color rendition of an illumination system compares to that of a reference radiator when illuminating eight reference colors, i.e., it is a relative measure of the shift in surface color of an object when lit by a particular lamp. The CRI Ra equals 100 if the color coordinates of a set of test colors being illuminated by the illumination system are the same as the coordinates of the same test colors being irradiated by the reference radiator.

Daylight has a high CRI (Ra of approximately 100), with incandescent bulbs also being relatively close (Ra greater than 95), and fluorescent lighting being less accurate (typical Ra of 70-80). Certain types of specialized lighting have very low CRI (e.g., mercury vapor or sodium lamps have Ra as low as about 40 or even lower). Sodium lights are used, e.g., to light highways—driver response time, however, significantly decreases with lower CRI Ra values (for any given brightness, legibility decreases with lower CRI Ra).

The color of visible light output by a light emitter, and/or the color of blended visible light output by a plurality of light emitters can be represented on either the 1931 CIE (Commission International de l'Eclairage) Chromaticity Diagram or the 1976 CIE Chromaticity Diagram. Persons of skill in the art are familiar with these diagrams, and these diagrams are readily available (e.g., by searching "CIE Chromaticity Diagram" on the internet).

The CIE Chromaticity Diagrams map out the human color perception in terms of two CIE parameters x and y (in the case of the 1931 diagram) or u' and v' (in the case of the 1976 diagram). Each point (i.e., each "color point") on the respective Diagrams corresponds to a particular hue. For a technical description of CIE chromaticity diagrams, see, for example, "Encyclopedia of Physical Science and Technology", vol. 7, 230-231 (Robert A Meyers ed., 1987). The spectral colors are distributed around the boundary of the outlined space, which includes all of the hues perceived by the human eye. The boundary represents maximum saturation for the spectral colors.

The 1931 CIE Chromaticity Diagram can be used to define colors as weighted sums of different hues. The 1976 CIE Chromaticity Diagram is similar to the 1931 Diagram, except that similar distances on the 1976 Diagram represent similar perceived differences in color.

The expression "hue", as used herein, means light that has a color shade and saturation that correspond to a specific point on a CIE Chromaticity Diagram, i.e., a point that can be characterized with x,y coordinates on the 1931 CIE Chromaticity Diagram or with u', v' coordinates on the 1976 CIE Chromaticity Diagram.

In the 1931 Diagram, deviation from a point on the Diagram (i.e., "color point") can be expressed either in terms of the x, y coordinates or, alternatively, in order to give an indication as to the extent of the perceived difference in color, in terms of MacAdam ellipses. For example, a locus of points defined as being ten MacAdam ellipses from a specified hue defined by a particular set of coordinates on the 1931 Diagram consists of hues that would each be perceived as differing from the specified hue to a common extent (and likewise for loci of points defined as being spaced from a particular hue by other quantities of MacAdam ellipses).

A typical human eye is able to differentiate between hues that are spaced from each other by more than seven MacAdam ellipses (but is not able to differentiate between hues that are spaced from each other by seven or fewer MacAdam ellipses).

Since similar distances on the 1976 Diagram represent similar perceived differences in color, deviation from a point on the 1976 Diagram can be expressed in terms of the coordinates, u' and v', e.g., distance from the point=$(\Delta u'^2 + \Delta v'^2)^{1/2}$. This formula gives a value, in the scale of the u' v' coordinates, corresponding to the distance between points. The hues defined by a locus of points that are each a common distance from a specified color point consist of hues that would each be perceived as differing from the specified hue to a common extent.

A series of points that is commonly represented on the CIE Diagrams is referred to as the blackbody locus. The chromaticity coordinates (i.e., color points) that lie along the blackbody locus obey Planck's equation: $E(\lambda)=A \lambda^{-5}/(e^{(B/T)}-1)$, where E is the emission intensity, $\lambda$ is the emission wavelength, T is the color temperature of the blackbody and A and B are constants. The 1976 CIE Diagram includes temperature listings along the blackbody locus. These temperature listings show the color path of a blackbody radiator that is caused to increase to such temperatures. As a heated object becomes incandescent, it first glows reddish, then yellowish, then white, and finally blueish. This occurs because the wavelength associated with the peak radiation of the blackbody radiator becomes progressively shorter with increased temperature, consistent with the Wien Displacement Law. Illuminants that produce light that is on or near the blackbody locus can thus be described in terms of their color temperature.

The emission spectrum of any particular light emitting diode is typically concentrated around a single wavelength (as dictated by the light emitting diode's composition and structure), which is desirable for some applications, but not desirable for others, (e.g., for providing general illumination, such an emission spectrum by itself would provide a very low CRI Ra).

In many situations (e.g., lighting devices used for general illuminations), the color of light output that is desired differs from the color of light that is output from a single solid state light emitter, and so in many of such situations, combinations of two or more types of solid state light emitters that emit light of different hues are employed.

The most common type of general illumination is white light (or near white light), i.e., light that is close to the blackbody locus, e.g., within about 10 MacAdam step ellipses of the blackbody locus on a 1931 CIE Chromaticity Diagram. Light with such proximity to the blackbody locus is referred to as "white" light in terms of its illumination, even though some light that is within 10 MacAdam step ellipses of the blackbody locus is tinted to some degree, e.g., light from incandescent bulbs is called "white" even though it sometimes has a golden or reddish tint; also, light having a correlated color temperature of 1500 K or less is reddish.

Light that is perceived as white can be made by blending two or more colors (or wavelengths). "White" solid state light emitting lamps have been produced by providing devices that mix different colors of light, e.g., by using light emitting diodes that emit light of differing respective colors and/or by converting some or all of the light emitted from the light emitting diodes using luminescent material. For example, as is well known, some lamps (referred to as "RGB lamps") use red, green and blue light emitting diodes, and other lamps use (1) one or more light emitting diodes that generate blue light and (2) luminescent material (e.g., one or more phosphor materials) that emits yellow light in response to excitation by light emitted by the light emitting diode, whereby the blue light and the yellow light, when mixed, produce light that is perceived as white light. While there is a need for more efficient white lighting, there is in general a need for more efficient lighting in all hues.

BRIEF SUMMARY

Some lighting devices comprise two or more light sources that emit light of different hues (e.g., a lighting device that comprises two or more solid state light emitters that emit light of different hues) which, when mixed, are intended to provide a desired color for the output light (e.g., white or near-white, or generally any other desired hue). With such lighting devices, the intensity of light emitted by the respective light sources that emit light of different hues can sometimes vary (e.g., depending on the ambient temperature and/or the age of the light source), which can cause the color of the output light to deviate from the hue that the lighting device is intended to emit. Separately or additionally, there can sometimes be a desire to adjust the hue of the light that is emitted by a lighting device (e.g., to change its color temperature).

In some aspects, the present inventive subject matter provides a device that can correct the color of output light from a lighting device to match the hue (and/or the lumen output) that a lighting device is intended to emit (or to at least be closer to the hue and/or lumen output that the lighting device is intended to emit). In some aspects, for example, the present inventive subject matter provides a device with which a user can monitor, tune and/or adjust the color (and/or monitor, tune and/or adjust the lumen output) of output light from a lighting device in the field (or in any other setting, e.g., in a factory).

Having the capability of monitoring, tuning and/or adjusting the color (and/or the lumen output) of output light from a lighting device can, e.g., allow a fixture to remain in use for longer than the user might otherwise have preferred (e.g., if the color and/or lumen output of output light had drifted).

In accordance with an aspect of the present inventive subject matter, there is provided a portable device that comprises a light detector and a color point correction calculator.

In accordance with an aspect of the present inventive subject matter, there is provided a portable device that comprises a light detector and a lumen output correction calculator.

In accordance with an aspect of the present inventive subject matter, there is provided a portable device that comprises (1) a light detector and (2) a color point and lumen output correction calculator.

In accordance with another aspect of the present inventive subject matter, there is provided a lighting system that comprises a lighting device comprising at least a first light source, and a portable device.

In accordance with another aspect of the present inventive subject matter, there is provided a method of lighting, comprising detecting light emitted from at least a first light source of a lighting device with a light detector of a portable device.

In accordance with another aspect of the present inventive subject matter, there is provided a method of lighting, comprising generating a color point correction signal with a color point correction calculator of a portable device.

In accordance with another aspect of the present inventive subject matter, there is provided a method of lighting, comprising generating a lumen output correction signal with a lumen output correction calculator of a portable device.

In accordance with another aspect of the present inventive subject matter, there is provided a method of lighting, comprising generating (1) a color point correction signal, (2) a lumen output correction signal, and/or (3) a color point correction and lumen output correction signal with a correction calculator of a portable device.

In accordance with another aspect of the present inventive subject matter, there is provided a method of lighting, comprising outputting (1) a color point correction signal, (2) a lumen output correction signal and/or (3) a color point correction and lumen output correction signal with a color point correction output element of a portable device.

In accordance with another aspect of the present inventive subject matter, there is provided a method of lighting, comprising placing a portable device in a calibration location, and detecting light emitted from the lighting device.

In accordance with a first aspect of the present inventive subject matter, there is provided a portable device that comprises:
  a light detector;
  a color point and/or lumen output correction calculator; and
  a color point and/or lumen output correction output element.

That is, in accordance with the first aspect of the present inventive subject matter, there can be provided a portable device that comprises:
  a light detector;
  a color point correction calculator; and
  a color point correction output element; or
a portable device that comprises:
  a light detector;
  a lumen output correction calculator; and
  a lumen output correction output element; or
a portable device that comprises:
  a light detector;
  a color point and lumen output correction calculator; and
  a color point and lumen output correction output element; or
a portable device that comprises:
  a light detector;
  a color point correction calculator;
  a color point correction output element;
  a lumen output correction calculator; and
  a lumen output correction output element; or
a portable device that comprises:
  a light detector;
  a color point and lumen output correction calculator;
  a color point correction output element; and
  a lumen output correction output element; or
a portable device that comprises:
  a light detector;
  a color point correction calculator;
  a lumen output correction calculator; and
  a color point and lumen output correction output element.

In some embodiments in accordance with the first aspect of the present inventive subject matter, which can include or not include, as suitable, any of the other features described herein, the color point and/or lumen output correction output element outputs a wireless color point and/or lumen output correction signal.

In accordance with a second aspect of the present inventive subject matter, there is provided a lighting system that comprises:
  a lighting device comprising at least a first light source; and
  a portable device that comprises:
    a light detector that detects at least light emitted from the first light source;
    a color point and/or lumen output correction calculator that generates a color point and/or lumen output correction signal; and
    a color point and/or lumen output correction output element that outputs the color point and/or lumen output correction signal to the lighting device.

In some embodiments in accordance with the second aspect of the present inventive subject matter, which can include or not include, as suitable, any of the other features described herein, the lighting device further comprises a receiver that receives the color point and/or lumen output correction signal from the color point and/or lumen output correction output element.

In accordance with a third aspect of the present inventive subject matter, there is provided a lighting device that comprises:
  at least a first light source; and
  a receiver that receives a color point and/or lumen output correction signal from a portable device.

In some embodiments in accordance with the third aspect of the present inventive subject matter, which can include or not include, as suitable, any of the other features described herein, the portable device comprises a light detector that detects a lumen level of at least one color hue.

In some embodiments in accordance with the third aspect of the present inventive subject matter, which can include or not include, as suitable, any of the other features described herein, the portable device comprises a light detector that detects lumen levels of at least two color hues.

In some embodiments in accordance with the third aspect of the present inventive subject matter, which can include or not include, as suitable, any of the other features described herein, the portable device comprises a light detector that sequentially detects lumen levels of at least two color hues.

In some embodiments in accordance with the third aspect of the present inventive subject matter, which can include or not include, as suitable, any of the other features described herein, the portable device comprises a color point output correction calculator that comprises at least one software application.

In some embodiments in accordance with the third aspect of the present inventive subject matter, which can include or not include, as suitable, any of the other features described herein, the portable device comprises a lumen output correction calculator that comprises at least one software application.

In accordance with a fourth aspect of the present inventive subject matter, there is provided a method of lighting, comprising:
  detecting light emitted from at least a first light source of a lighting device with a light detector of a portable device;
  generating a correction signal (color point and/or lumen output) with a correction calculator of the portable device; and
  outputting the correction signal with a correction output element of the portable device.

In some embodiments in accordance with the fourth aspect of the present inventive subject matter, which can include or not include, as suitable, any of the other features described herein, the correction signal is received by a receiver of the lighting device.

In some embodiments in accordance with the fourth aspect of the present inventive subject matter, which can include or not include, as suitable, any of the other features described herein, the light detector detects a lumen level of the first light source of the lighting device.

In some embodiments in accordance with the fourth aspect of the present inventive subject matter, which can include or not include, as suitable, any of the other features described herein, the light detector detects lumen levels of at least two color hues of light sources of the lighting device.

In some embodiments in accordance with the fourth aspect of the present inventive subject matter, which can include or not include, as suitable, any of the other features described herein, the light detector sequentially detects lumen levels of at least two color hues of light sources of the lighting device.

In some embodiments in accordance with the fourth aspect of the present inventive subject matter, which can include or not include, as suitable, any of the other features described herein, the correction calculator comprises at least one software application.

In accordance with a fifth aspect of the present inventive subject matter, there is provided a method of lighting, comprising:
   placing a portable device in a calibration location;
   illuminating a lighting device comprising at least a first light source;
   detecting light emitted from the lighting device with a light detector of the portable device, the portable device having a correction calculator (that calculates corrections for color point, for lumen output and/or for both color point and lumen output).

In some embodiments in accordance with the fifth aspect of the present inventive subject matter, which can include or not include, as suitable, any of the other features described herein, light emitted from the lighting device is detected by the light detector during an initial ten hours of illumination of the lighting device.

In some embodiments in accordance with the fifth aspect of the present inventive subject matter, which can include or not include, as suitable, any of the other features described herein, the method further comprises:
   again placing the portable device in the calibration location;
   detecting light emitted from the lighting device with the light detector;
   performing a correction calculation with the correction calculator to generate a correction signal; and
   transmitting the correction signal from a correction output element of the portable device to the lighting device.

In some embodiments in accordance with the present inventive subject matter, which can include or not include, as suitable, any of the other features described herein, the portable device is a smart phone.

In some embodiments in accordance with the present inventive subject matter, which can include or not include, as suitable, any of the other features described herein, the portable device is a portable computing device.

In some embodiments in accordance with any of the first and second aspects of the present inventive subject matter, which can include or not include, as suitable, any of the other features described herein, the light detector detects a lumen level of at least one color hue.

In some embodiments in accordance with any of the first and second aspects of the present inventive subject matter, which can include or not include, as suitable, any of the other features described herein, the light detector detects lumen levels of at least two color hues.

In some embodiments in accordance with any of the first and second aspects of the present inventive subject matter, which can include or not include, as suitable, any of the other features described herein, the light detector sequentially detects lumen levels of at least two color hues.

In some embodiments in accordance with any of the first and second aspects of the present inventive subject matter, which can include or not include, as suitable, any of the other features described herein, the correction calculator comprises at least one software application.

In some embodiments in accordance with any of the second, third, fourth and fifth aspects of the present inventive subject matter, which can include or not include, as suitable, any of the other features described herein, the first light source comprises at least one solid state light emitter.

In some embodiments in accordance with any of the second, third, fourth and fifth aspects of the present inventive subject matter, which can include or not include, as suitable, any of the other features described herein, the first light source comprises at least one light emitting diode.

In some embodiments in accordance with any of the third and fourth aspects of the present inventive subject matter, which can include or not include, as suitable, any of the other features described herein, the correction signal is a wireless signal.

In any device, system or method described herein where a color point and/or lumen output is corrected, such correction can be made on any one or more of the one or more light sources in the device, system or method.

In any part of the description herein, the expression "correction signal" (unless specified otherwise) refers to (1) a color point correction signal, (2) a lumen output correction signal, or (3) a color point and lumen output correction signal.

In any part of the description herein, the expression "correction calculator" (unless specified otherwise) refers to (1) a color point correction calculator, (2) a lumen output correction calculator, or (3) a color point and lumen output correction calculator.

In any part of the description herein, the expression "correction output element" (unless specified otherwise) refers to (1) a color point correction output element, (2) a lumen output correction output element, or (3) a color point and lumen output correction output element.

The inventive subject matter may be more fully understood with reference to the accompanying drawings and the following detailed description of the inventive subject matter.

BRIEF DESCRIPTION OF THE DRAWING FIGURES

Figure 1B:
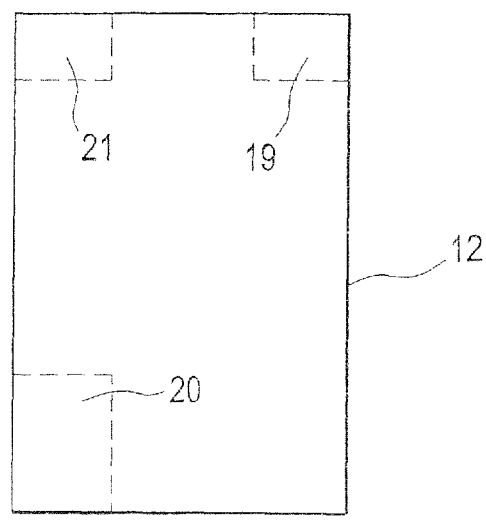

FIG. 1 schematically depicts a lighting system 10 in accordance with the present inventive subject matter.

Figure 2:
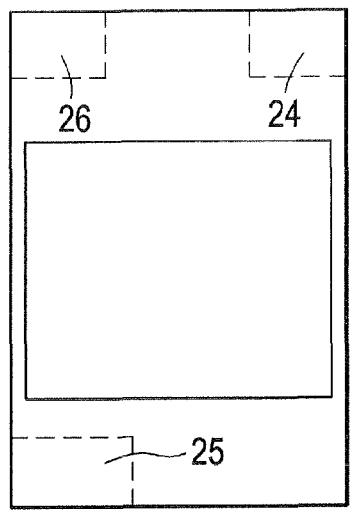

FIG. 2 schematically depicts a portable device in accordance with the present inventive subject matter, in the form of a portable computing device 23.

Figure 3:
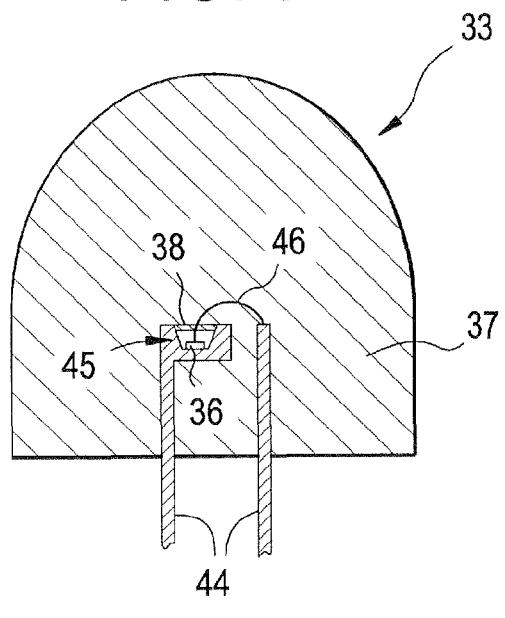

FIG. 3 schematically depicts an LED 33.

Figure 4:
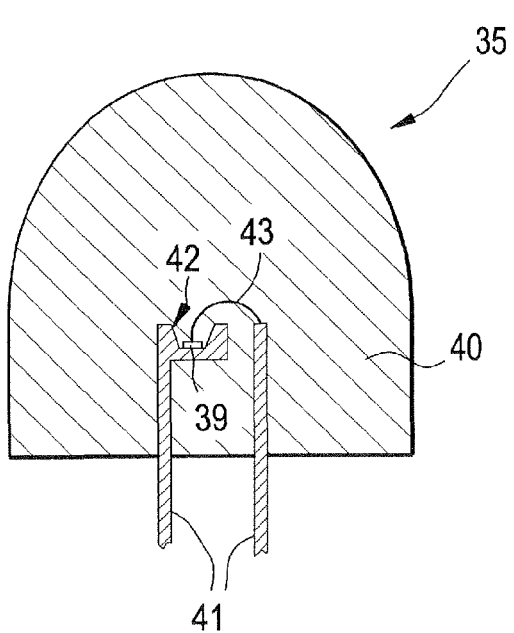

FIG. 4 schematically depicts an LED 35.

Figure 5:
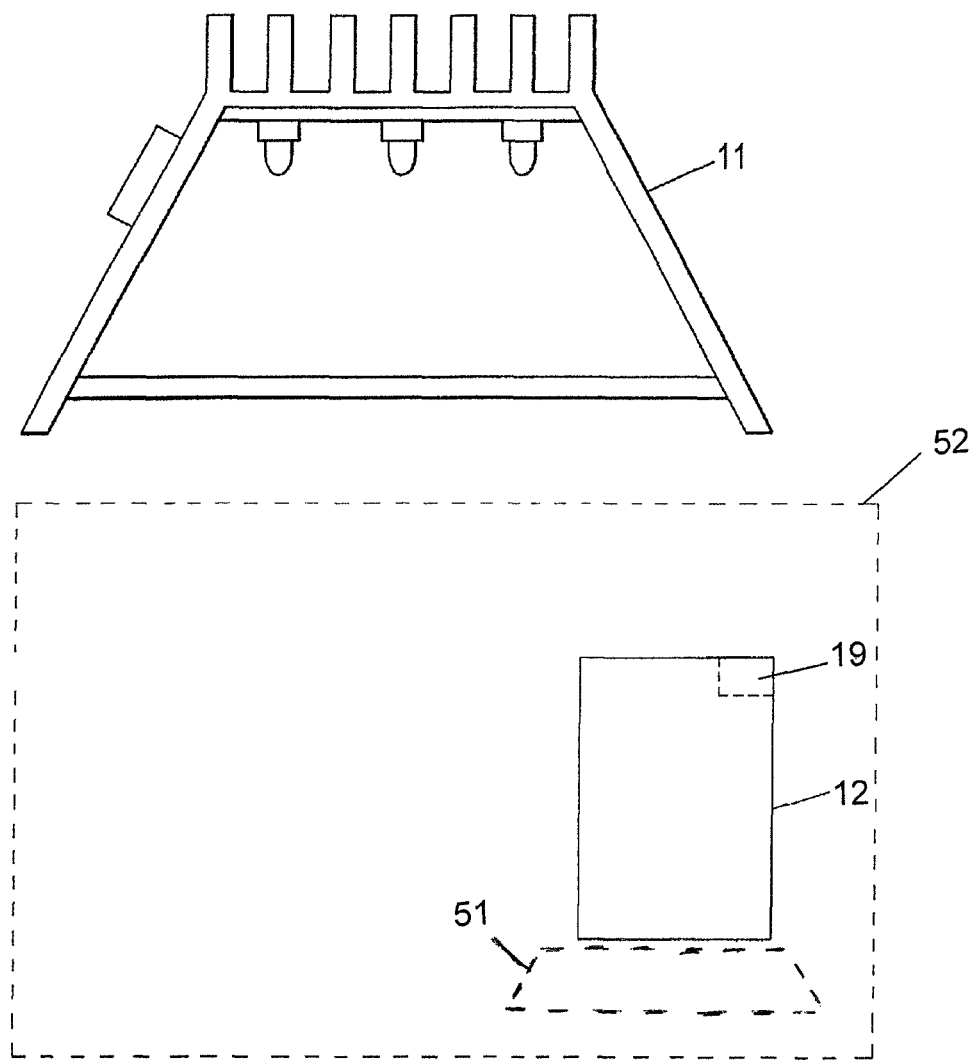

FIG. 5 schematically depicts a structure holding a light detector in place relative to a lighting device, and in a calibration location.

DETAILED DESCRIPTION

The present inventive subject matter now will be described more fully hereinafter with reference to the accompanying drawings, in which embodiments of the inventive subject matter are shown. However, this inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on", being mounted "on", being mounted "to", or extending "onto" another element, it can be in or on the other element, and/or it can be directly on the other element, and/or it can extend directly onto the other element, and it can be in direct contact or indirect contact with the other element (e.g., intervening elements may also be present). In contrast, when an element is referred to herein as being "directly on" or extending "directly onto" another element, there are no intervening elements present. Also, when an element is referred to herein as being "connected" or "coupled" to another element, it can be directly connected or coupled to the other element, or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

The expression "in contact with", as used herein, means that the first structure that is in contact with a second structure is in direct contact with the second structure or is in indirect contact with the second structure. The expression "in indirect contact with" means that the first structure is not in direct contact with the second structure, but that there are a plurality of structures (including the first and second structures), and each of the plurality of structures is in direct contact with at least one other of the plurality of structures (e.g., the first and second structures are in a stack and are separated by one or more intervening layers). The expression "direct contact", as used in the present specification, means that the first structure which is "in direct contact" with a second structure is touching the second structure and there are no intervening structures between the first and second structures at least at some location.

A statement herein that two components in a device are "electrically connected," means that there are no components electrically between the components that affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board, are electrically connected. A statement herein that two components in a device are "electrically connected" is distinguishable from a statement that the two components are "directly electrically connected", which means that there are no components electrically between the two components.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "top" may be used herein to describe one element's relationship to another element (or to other elements). Such relative terms are intended to encompass different orientations of the device in addition to the orientation depicted in the Figures. For example, if the device in the Figures is turned over, elements described as being on a "top" side with respect to other elements would then be oriented on a "bottom" sides with respect to other elements. The exemplary term "top" can therefore encompass both an orientation of "top" and "bottom," depending on the particular orientation.

The expression "illumination" (or "illuminated"), as used herein when referring to a light source, means that at least some current is being supplied to the light source to cause the light source to emit at least some electromagnetic radiation (e.g., visible light). The expression "illuminated" encompasses situations where the light source emits electromagnetic radiation continuously, or intermittently at a rate such that a human eye would perceive it as emitting electromagnetic radiation continuously or intermittently, or where a plurality of light sources of the same color or different colors are emitting electromagnetic radiation intermittently and/or alternatingly (with or without overlap in "on" times), e.g., in such a way that a human eye would perceive them as emitting light continuously or intermittently (and, in some cases where different colors are emitted, as separate colors or as a mixture of those colors).

The expression "excited", as used herein when referring to luminescent material, means that at least some electromagnetic radiation (e.g., visible light, UV light or infrared light) is contacting the luminescent material, causing the luminescent material to emit at least some light. The expression "excited" encompasses situations where the luminescent material emits light continuously, or intermittently at a rate such that a human eye would perceive it as emitting light continuously or intermittently, or where a plurality of luminescent materials that emit light of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosed space (uniformly or non-uniformly).

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As noted above, in accordance with a first aspect of the present inventive subject matter, there is provided a portable device that comprises a light detector, a correction calculator (that calculates color point correction and/or lumen output correction) and a correction output element (that outputs color point and/or lumen output correction).

A portable device in accordance with the present inventive subject matter can be any suitable portable device, persons of skill in the art being familiar with a wide variety of suitable portable devices. For instance, examples of suitable portable devices include cellular telephones such as smart phones, portable computing devices (e.g., laptop computers, personal digital assistants, tablet computers, portable game systems such as Nintendo® game systems, PSP® game systems, portable media players such as iPods, pentop computers, etc.). Any device that is portable and that comprises a light detector (as described herein), a correction calculator (as described herein) and a correction output element (as described herein) is a portable device in accordance with the present inventive subject matter.

A light detector in accordance with some embodiments of the present inventive subject matter can be any device or component that is suitable for detecting light, persons of skill in the art being familiar with a wide variety of suitable light detectors. Suitable examples of suitable light detectors include color sensors, light sensors and digital cameras (still picture or video).

Persons of skill in the art are familiar with a wide variety of sensors, and any one or more of such sensors can be employed in or as the light detectors of the present inventive subject matter. Among these well known sensors are sensors that are sensitive to all visible light, as well as sensors that are sensitive to only a portion of visible light. For example, a sensor can be a unique and inexpensive sensor (GaP:N light emitting diode) that views the entire light flux but is only (optically) sensitive to one or more of a plurality of light emitting diodes. For instance, in one specific example, a sensor can be sensitive to only a particular range (or ranges) of wavelengths, and the sensor can provide information as to the brightness of light in that range (or those ranges).

A light detector can detect a color hue of a mixture of light (i.e., identify the color point), and optionally can also detect the brightness of the light of that hue. Alternatively or additionally, a light detector can detect a brightness of light of a particular hue or a brightness of light within a particular range of hues (or a light detector can detect respective brightnesses of light of particular hues, and/or respective brightnesses of light within one or more particular ranges of hues). For instance, a light detector can detect (1) the color hue of light being emitted from a lighting device (i.e., the lumen output for the lighting device) (and optionally also the brightness of light of that color hue), and/or (2) the brightness (or respective brightnesses) of light of a specific color point or light within a specific region of color points (or light of specific respective color points and/or light within one or more specific regions of color points). For example, a light detector can detect a brightness of light being emitted from one or more solid state light emitters that emit light of a particular hue (or that emit light within a particular range of hues), and/or a light detector can detect respective brightnesses of light being emitted from two or more groups of solid state light emitters (each group comprising at least one solid state light emitter) that emit light of respective particular hues (and/or that emit light within respective particular ranges of hues).

A light detector can be a component or device that is built into a portable device, e.g., it can be a camera (for taking still images or for taking video) of a cellular telephone or a camera of a tablet computer.

A correction calculator in accordance with some embodiments of the present inventive subject matter can be any device or component that is suitable for generating a correction signal based on (1) color hue and/or brightness information from a light detector, and/or (2) a desired output color hue (or range of hues) and/or brightness (or range of brightness), a wide variety of correction calculators, and components for use in making them, being well known to persons of skill in the art. For example, a correction calculator can comprise a processor and one or more software application.

Persons of skill in the art are familiar with a variety of types of circuitry and/or software that can calculate changes needed to carry out a color point and/or lumen output correction (e.g., to calculate a change in the current to be supplied to one or more light sources (or strings of light sources), and/or to calculate respective changes in the current to be supplied to different light sources (or different strings of light sources) in order to change the color point and/or lumen output of light emitted from a lighting device to match a desired color point and/or a desired lumen output) or to become closer to a target color point and/or lumen output.

For example, a correction calculator may comprise a digital controller, an analog controller or a combination of digital and analog. For example, a correction calculator may comprise an application specific integrated circuit (ASIC), a microprocessor, a microcontroller, a collection of discrete components, or combinations thereof.

A correction output element in accordance with some embodiments of the present inventive subject matter can be any device or component that is suitable for outputting a correction signal, persons of skill in the art being familiar with a wide variety of devices and/or components for use as an output element (or for use in an output element). In some embodiments in accordance with the present inventive subject matter, a correction output element outputs a wireless correction signal.

A correction signal can be in any suitable format, persons of skill in the art being familiar with a wide variety of suitable formats. For example, a correction signal can be in a format that can be transmitted and/or received via RS232, USB, I2C, IR, RF, visible light, or any other suitable format.

As noted above, in accordance with a second aspect of the present inventive subject matter, there is provided a lighting system that comprises (1) a lighting device (which comprises one or more light source(s)) and (2) a portable device that comprises a light detector, a correction calculator and a correction output element. The respective discussions above of portable devices, light detectors, correction calculators and correction output elements in connection with the first aspect of the present inventive subject matter apply to those elements in the second aspect of the present inventive subject matter, i.e., any portable devices, light detectors, correction calculators and correction output elements described above in connection with the first aspect of the present inventive subject matter can be employed in lighting systems in accordance with the second aspect of the present inventive subject matter.

Another feature of lighting systems in accordance with the present inventive subject matter is that user adjustability of color point and/or lumen output of lighting devices can be provided without the need for complicated control systems. For example, a user might decide that a particular lighting device should emit light of a lower correlated color temperature (CCT) that it did when it was installed. With lighting systems as described herein, it is possible, for example, for the user to use a smart phone to change the CCT of the light being emitted from the lighting device.

A light source employed in a lighting system in accordance with the present inventive subject matter can be any suitable light source, a wide variety of which are well known to persons of skill in the art.

Persons of skill in the art are familiar with, and have ready access to, a wide variety of light sources of different colors, and any suitable light sources can be employed in accordance with the present inventive subject matter.

Representative examples of types of light sources include incandescent lights, fluorescent lamps, solid state light emitters, laser diodes, thin film electroluminescent devices, light emitting polymers (LEPs), halogen lamps, high intensity discharge lamps, electron-stimulated luminescence lamps, etc., with or without filters. That is, the at least one light source can comprise a single light source, a plurality of light sources of a particular type, or any combination of one or more light sources of each of a plurality of types. While there is much discussion herein of the merits of solid state light emitters, many aspects of the present inventive subject matter as discussed herein can be applied to other light sources, e.g., incandescent light sources, fluorescent light sources, etc.

Each of the one or more light sources can be of any suitable shape, a variety of which are known to those of skill in the art, e.g., A lamps, BR lamps, PAR lamps, MR lamps, forward reflecting lamps, strip lights, portable lights, etc. Lighting devices according to the present inventive subject matter can comprise one or more light sources of a particular shape or one or more light sources of each of a plurality of different shapes.

Each of the one or more light sources can be designed to emit light in any suitable pattern, e.g., in the form of a flood light, a spotlight, a downlight, etc. Lighting devices according to the present inventive subject matter can comprise one or more light sources that emit light in any suitable pattern, or one or more light sources that emit light in each of a plurality of different patterns.

Persons of skill in the art are familiar with, and have ready access to, a wide variety of solid state light emitters, and any suitable solid state light emitter (or solid state light emitters) can be employed as a light source in accordance with the present inventive subject matter. Representative examples of solid state light emitters include light emitting diodes (inorganic or organic, including polymer light emitting diodes (PLEDs)) and a wide variety of luminescent materials, as well as combinations (e.g., one or more light emitting diodes and/or one or more luminescent materials).

Persons of skill in the art are familiar with, and have ready access to, a variety of solid state light emitters that emit light having desired peak emission wavelength (or range of wavelengths) and/or dominant emission wavelength (or range of wavelengths), and any of such solid state light emitters (discussed in more detail below), or any combinations of such solid state light emitters, can be employed in embodiments that comprise one or more solid state light emitters.

Solid state light emitters, such as LEDs, may be energy efficient, so as to satisfy ENERGY STAR® program requirements. ENERGY STAR program requirements for LEDs are defined in "*ENERGY STAR® Program Requirements for Solid State Lighting Luminaires, Eligibility Criteria—Version 1.1*", Final: Dec. 19, 2008, the disclosure of which is hereby incorporated herein by reference in its entirety as if set forth fully herein.

Light emitting diodes are semiconductor devices that convert electrical current into light. A wide variety of light emitting diodes are used in increasingly diverse fields for an ever-expanding range of purposes. More specifically, light emitting diodes are semiconducting devices that emit light (ultraviolet, visible, or infrared) when a potential difference is applied across a p-n junction structure. There are a number of well known ways to make light emitting diodes and many associated structures, and the present inventive subject matter can employ any such devices.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

Light emitting diodes can offer a long operational lifetime relative to conventional incandescent and fluorescent bulbs. Light emitting diode lifetime is typically measured by an "L70 lifetime", i.e., a number of operational hours in which the light output of a LED lighting system does not degrade by more than 30%. Typically, an L70 lifetime of at least 25,000 hours is desirable, and has become a standard design goal. As used herein, L70 lifetime is defined by Illuminating Engineering Society Standard LM-80-08, entitled "*IES Approved Method for Measuring Lumen Maintenance of LED Light Sources*", Sep. 22, 2008, ISBN No. 978-0-87995-227-3, also referred to herein as "LM-80", the disclosure of which is hereby incorporated herein by reference in its entirety as if set forth fully herein, and/or using the lifetime projections found in the ENERGY STAR Program Requirements cited above or described by the ASSIST method of lifetime prediction, as described in "*ASSIST Recommends . . . LED Life For General Lighting: Definition of Life*", Volume 1, Issue 1, February 2005, the disclosure of which is hereby incorporated herein by reference as if set forth fully herein.

In some aspects of the present inventive subject matter, which can include or not include any of the features described elsewhere herein, there are provided lighting devices that can provide an expected L70 lifetime of at least 25,000 hours. Lighting devices according to some embodiments of the present inventive subject matter provide expected L70 lifetimes of at least 35,000 hours or at least 50,000 hours.

A luminescent material is a material that emits a responsive radiation (e.g., visible light) when excited by a source of exciting radiation. In many instances, the responsive radiation has a wavelength (or hue) that is different from the wavelength (or hue) of the exciting radiation.

Luminescent materials can be categorized as down-converting, i.e., a material that converts photons to a lower energy level (longer wavelength) or up-converting, i.e., a material that converts photons to a higher energy level (shorter wavelength).

Persons of skill in the art are familiar with, and have ready access to, a variety of luminescent materials that emit light having a desired peak emission wavelength and/or dominant emission wavelength, or a desired hue, and any of such luminescent materials, or any combinations of such luminescent materials, can be employed, if desired.

One type of luminescent material are phosphors, which are readily available and well known to persons of skill in the art. Other examples of luminescent materials include scintillators, day glow tapes and inks that glow in the visible spectrum upon illumination with ultraviolet light.

The one or more luminescent materials can be provided in any suitable form. For example, the luminescent element can be embedded in a resin (i.e., a polymeric matrix), such as a silicone material, an epoxy material, a glass material or a metal oxide material, and/or can be applied to one or more surfaces of a resin, to provide a lumiphor.

In general, light of any combination and number of colors can be mixed in lighting devices according to the present inventive subject matter. As noted above, persons of skill in the art are familiar with a wide variety of types of light sources, each of which can emit light of any suitable hue.

In the case of light emitting diodes, the emission spectrum of any particular light emitting diode is typically concentrated around a single wavelength (as dictated by the light emitting diode's composition and structure). As a result, in many cases (e.g., to make devices that emit light perceived as white or near-white, and/or to make devices that emit light with high CRI Ra, and/or to make devices that emit light of a hue that differs from that of each of the individual light sources, and/or to make devices that emit light that is not highly saturated), light sources that emit light of differing hues are employed in lighting devices (e.g., one or more solid state light emitters and optionally also one or more other types of light sources, e.g., additional light emitting diodes, luminescent materials, incandescent lights, etc.).

With respect to lighting devices that comprise light sources that emit light in two or more respective hues, there are a variety of reasons that one or more of the light sources might cease emitting light and/or vary in their brightness of light emission, and/or vary in the hue being emitted, which can throw off the balance of color output and cause the lighting device to emit light that is perceived as being of a color that differs from the desired color of light output.

In the case of solid state light emitters, one example of a reason that one or more solid state light emitters might vary in their brightness of light emission is temperature change (resulting, e.g., from change in ambient temperature and/or heating up of the solid state light emitters). Some types of solid state light emitters (e.g., solid state light emitters that emit light of different colors) experience differences in brightness of light emission (if supplied with the same current) at different temperatures, and frequently such changes in brightness occur to differing extents for emitters that emit light of different colors as temperature changes. For example, light emitting diodes that emit red light often have a very strong temperature dependence (e.g., AlInGaP light emitting diodes can reduce in optical output by ~20% when heated up by ~40 degrees C., that is, approximately −0.5% per degree C.; and blue InGaN+YAG:Ce light emitting diodes can reduce by about −0.15%/degree C.).

Another example of a reason that one or more solid state light emitters (or other light sources) might vary in their brightness of light emission is aging. Some solid state light emitters (e.g., solid state light emitters that emit light of different colors) experience decreases in brightness of light emission (if supplied with the same current) as they age, and frequently such decreases in brightness occur at differing rates for solid state light emitters that emit light of different colors.

Another example of a reason that one or more solid state light emitters (or other light sources) might vary in their brightness of light emission is damage to the solid state light emitter(s) (or other light sources) and/or damage to circuitry that supplies current to the solid state light emitter(s) (or other light sources).

As mentioned above, with regard to lighting devices that comprise two or more light sources, any suitable combination of light sources can be employed. For example, respective light sources can be of different types (e.g., there can be two incandescent light sources, one fluorescent light source and three solid state light emitter sources), and/or they can emit light of differing hues (e.g., there can be two incandescent light sources that emit light of a first hue, one fluorescent light source that emits light of a second hue, three light emitting diodes that emit light of a third hue, one light emitting diode that emits light of a fourth hue, and one luminescent material (packaged with each of the three light emitting diodes that emit light of a third hue) that emits light of a fifth hue; alternatively, there can be just three light emitting diodes that emit light of a first hue, one light emitting diode that emits light of a second hue, and one luminescent material (packaged with each of the three light emitting diodes that emit light of a first hue) that emits light of a third hue.

Below are discussions of a number of representative examples of combinations of light sources that could be employed in accordance with the present inventive subject matter.

(1) There can be provided a lighting device that comprises (a) a first light source (or combination of light sources, e.g., one or packages that each comprise one or more light emitting diodes that emit light having dominant wavelength in the range of from about 400 nm to about 480 nm and one or more luminescent material that emits light having dominant wavelength in the range of from about 500 nm to about 585 nm) that emits light that has x, y color coordinates (on a 1931 CIE Chromaticity Diagram) which define a point that is within a first area on the 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, and (b) a second light source (or combination of light sources, e.g., one or more light emitting diodes that emit light having dominant wavelength in the range of from about 600 nm to about 640 nm) that emits light having dominant wavelength in the range of from about 600 nm to about 800 nm or from about −495 nm to about −540 nm.

Some of the wavelength values in the preceding paragraph (and in paragraphs below) are negative quantities. Negative wavelength values mean that the wavelength value is a complementary color dominant, i.e., the wavelength cannot be specified with a standard dominant because the color point is on the red-purple boundary—in such situations, by convention, the color point is reflected through the point E, i.e., 0.333, 0.333 (on the 1931 Chromaticity Diagram) onto the border of the 1931 Chromaticity Diagram; that is, the color point that has a wavelength of −568 nm is identified as such because by drawing a ray that starts at the color point (along the red-purple boundary on the border of the 1931 Chromaticity Diagram) and passes through E, the ray will again intersect the border of the color diagram at 568 nm.

(2) There can be provided a lighting device that comprises (a) a first light source (or combination of light sources) that emits light that has x, y color coordinates (on a 1931 CIE Chromaticity Diagram) which define a point that is within a second area on the 1931 CIE Chromaticity Diagram enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53 (in the 1976 CIE Chromaticity Diagram, the sixth point has u', v' coordinates of 0.17, 0.48, the seventh point has u', v' coordinates of 0.20, 0.48, the eighth point has u', v' coordinates of 0.22, 0.53, the ninth point has u', v' coordinates of 0.22, 0.55, and the tenth point has u', v' coordinates of 0.18, 0.55), and (b) a second light source (or combination of light sources) that emits light having dominant wavelength in the range of from about 600 nm to about 800 nm or from about −495 nm to about −540 nm.

(3) There can be provided a lighting device that comprises (a) a first light source (or combination of light sources) that emits light that has x, y color coordinates (on a 1931 CIE Chromaticity Diagram) which define a point that is within a third area on the 1931 CIE Chromaticity Diagram enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23, and (b) a second light source (or combination of light sources) that emits light having dominant wavelength in the range of from about 495 nm to about 580 nm.

(4) There can be provided a lighting device that comprises (a) a first light source (or combination of light sources) that emits light that has x, y color coordinates (on a 1931 CIE Chromaticity Diagram) which define a point that is within a fourth area on the 1931 CIE Chromaticity Diagram enclosed by fifteenth, sixteenth, seventeenth, eighteenth and nineteenth line segments, the fifteenth line segment connecting a fifteenth point to a sixteenth point, the sixteenth line segment connecting the sixteenth point to a seventeenth point, the seventeenth line segment connecting the seventeenth point to an eighteenth point, the eighteenth line segment connecting the eighteenth point to a nineteenth point, and the nineteenth line segment connecting the nineteenth point to the fifteenth point, the fifteenth point having x, y coordinates of 0.35, 0.48, the sixteenth point having x, y coordinates of 0.26, 0.50, the seventeenth point having x, y coordinates of 0.13, 0.26, the eighteenth point having x, y coordinates of 0.15, 0.20, and the nineteenth point having x, y coordinates of 0.26, 0.28, and (b) a second light source (or combination of light sources) that emits light having dominant wavelength in the range of from about 603 nm to about 800 nm or from about −495 nm to about −530 nm.

(5) There can be provided a lighting device that comprises (a) a first light source (or combination of light sources) that emits light that has x, y color coordinates (on a 1931 CIE Chromaticity Diagram) which define a point that is within a fifth area on the 1931 CIE Chromaticity Diagram enclosed by twentieth, twenty-first, twenty-second and twenty-third line segments, the twentieth line segment connecting a twentieth point to a twenty-first point, the twenty-first line segment connecting the twenty-first point to a twenty-second point, the twenty-second line segment connecting the twenty-second point to a twenty-third point, the twenty-third line segment connecting the twenty-third point to the twentieth point, the twentieth point having x, y coordinates of 0.21, 0.28, the twenty-first point having x, y coordinates of 0.26, 0.28, the twenty-second point having x, y coordinates of 0.32, 0.42, and the twenty-third point having x, y coordinates of 0.28, 0.44, and (b) a second light source (or combination of light sources) that emits light having dominant wavelength in the range of from about 603 nm to about 800 nm or from about −495 nm to about −530 nm.

(6) There can be provided a lighting device that comprises (a) a first light source (or combination of light sources) that emits light that has x, y color coordinates (on a 1931 CIE Chromaticity Diagram) which define a point that is within a sixth area on the 1931 CIE Chromaticity Diagram enclosed by twenty-twenty-seventh, twenty-fifth, twenty-sixth and twenty-seventh line segments, the twenty-fourth line segment connecting a twenty-fourth point to a twenty-fifth point, the twenty-fifth line segment connecting the twenty-fifth point to a twenty-sixth point, the twenty-sixth line segment connecting the twenty-sixth point to a twenty-seventh point, the twenty-seventh line segment connecting the twenty-seventh point to the twenty-fourth point, the twenty-fourth point having x, y coordinates of 0.30, 0.49, the twenty-fifth point having x, y coordinates of 0.35, 0.48, the twenty-sixth point having x, y coordinates of 0.32, 0.42, and the twenty-seventh point having x, y coordinates of 0.28, 0.44, and (b) a second light source (or combination of light sources) that emits light having dominant wavelength in the range of from about 603 nm to about 800 nm or from about −495 nm to about −530 nm.

A lighting device in accordance with the present inventive subject matter can be any suitable lighting device, a wide variety of which are well known to persons of skill in the art.

As noted above, in some embodiments of lighting devices in accordance with the present inventive subject matter, which can include or not include, as suitable, any of the other features described herein, the lighting device further comprises a receiver that receives the correction signal from the correction output element. The receiver can be any component or device that can receive a signal, persons of skill in the art being familiar with a wide variety of such receivers. For example, a receiver can receive a signal in a format that can be transmitted and/or received via RS232, USB, I2C, IR, RF, visible light, or any other suitable format.

A modification of an IR interface may allow visible-light communication using fixture-side light emitting diodes that are used to generate light in normal operation.

A proxy may be employed, e.g., in the form of a room-level and/or building-level lighting control system, through which a lighting device can receive signals.

Some embodiments in accordance with the present inventive subject matter can comprise one or more controllers. Persons of skill in the art are familiar with a variety of types of circuitry that can adjust current supplied to one or more light sources (or groups of light sources, or strings of light sources), and/or which can adjust respective currents supplied to different light sources (or groups or strings of light sources) in response to a correction signal, and any of such types of circuitry can be employed in accordance with the present inventive subject matter.

As noted above, in accordance with a third aspect of the present inventive subject matter, there is provided a lighting device that comprises at least a first light source and a receiver that receives a correction signal from a portable device. The respective discussions above of light sources and receivers apply to those elements in the third aspect of the present inventive subject matter, i.e., any light sources and receivers described above can be employed in lighting devices in accordance with the third aspect of the present inventive subject matter.

As noted above, in accordance with a fourth aspect of the present inventive subject matter, there is provided a method of lighting that comprises:
  detecting light emitted from at least a first light source of a lighting device with a light detector of a portable device;
  generating a correction signal with a correction calculator of the portable device; and
  outputting the correction signal with a correction output element of the portable device.

The respective discussions above of light detectors, portable devices, correction calculators and correction output elements apply to those elements in the fourth aspect of the present inventive subject matter, i.e., any light detectors, portable devices, correction calculators and correction output elements described above can be employed in methods in accordance with the fourth aspect of the present inventive subject matter.

Detecting light emitted from at least a first light source of a lighting device with a light detector of a portable device can be accomplished in any of a variety of ways that are well known to persons of skill in the art, using devices and/or components as described herein.

Generating a correction signal with a correction calculator of a portable device can be accomplished in any of a variety of ways that are well known to persons of skill in the art, using devices and/or components as described herein.

Outputting a correction signal with a correction output element of the portable device can be accomplished in any of a variety of ways that are well known to persons of skill in the art, using devices and/or components as described herein.

As noted above, in accordance with a fifth aspect of the present inventive subject matter, there is provided a method of lighting that comprises:
  placing a portable device in a calibration location;
  illuminating a lighting device comprising at least a first light source;
  detecting light emitted from the lighting device with a light detector of the portable device, the portable device having a correction calculator.

The respective discussions above of portable devices, lighting devices, light sources, light detectors and correction calculators apply to those elements in the fifth aspect of the present inventive subject matter, i.e., any portable devices, lighting devices, light sources, light detectors and correction calculators described above can be employed in methods in accordance with the fifth aspect of the present inventive subject matter.

As a representative example of a method in accordance with the fifth aspect of the present inventive subject matter, a re-tuning method might include the use of a video camera built into a smart phone. This camera may need to be calibrated and/or held very close to a lighting device being re-tuned in order to obtain high accuracy. Calibration of such a camera could be done with a reference lamp, or camera technology may be sufficient (or may become sufficient) to negate the desire for calibration. In addition, image processing software may optionally be employed in order to correct for viewing angles, distances, camera settings, ambient light, etc., to achieve more accurate measurement. Persons of skill in the art are familiar with such software and have access to such software.

In this representative example of a method in accordance with the fifth aspect of the present inventive subject matter, once a measurement has been taken, a correction can be automatically be applied and communicated back to the lighting device. In some designs where a dominant mechanism for lifetime determination is lumen level and color degradation, lifetime could be effectively reset to zero, or at least reduced dramatically, without replacement of the lighting device or any part thereof.

Calibration of a light detector, if deemed to be necessary and/or desirable, can be achieved in any suitable way, a variety of which are well known to persons of skill in the art. For instance, as described above, calibration could be accomplished using a reference light. Alternatively or additionally, calibration for a particular lighting device (or lighting devices) could be accomplished using the lighting device itself, e.g., using light output from the lighting device during its initial use, e.g., within the initial ten hours (or less) that it is illuminated (e.g., immediately after the lighting device is first installed and illuminated). In any calibration (and/or any time lumen output for a lighting device is checked), it might be useful to note the precise location of the light detector relative to the lighting device (e.g., it may be useful for the light detector to be in substantially the same location relative to a lighting device during an initial calibration and during any subsequent light detection using the light detector. In some embodiments, structure can be provided to hold a light detector in place so that a user can easily ensure that the location of the light detector relative to the lighting device is substantially consistent.

In some embodiments in accordance with the fifth aspect of the present inventive subject matter, which can include or not include, as suitable, any of the other features described herein, the method further comprises:
  again placing the portable device in the calibration location;
  detecting light emitted from the lighting device with the light detector;
  performing a correction calculation with the correction calculator to generate a correction signal; and
  transmitting the correction signal from a correction output element of the portable device to the lighting device.

As discussed above, detecting light emitted from a lighting device with a light detector of a portable device can be accomplished in any of a variety of ways that are well known to persons of skill in the art, using devices and/or components as described herein.

In some aspects of the present inventive subject matter, there are provided lighting devices that provide lumen output of at least 600 lumens, and in some embodiments at least 750 lumens, at least 900 lumens, at least 1000 lumens, at least 1100 lumens, at least 1200 lumens, at least 1300 lumens, at least 1400 lumens, at least 1500 lumens, at least 1600 lumens, at least 1700 lumens, at least 1800 lumens (or in some cases at least even higher lumen outputs, such as at least 2000 lumens, at least 3000 lumens, at least 4000 lumens or more), and/or CRI Ra of at least 70 (and in some embodiments at least 80, at least 85, at least 90 or at least 95).

In some embodiments according to the present inventive subject matter, including some embodiments that include or do not include any of the features as discussed above, a lighting device further comprises circuitry that delivers current from at least one energy source to at least one light source to enable illumination of the light source(s).

In some lighting devices according to the present inventive subject matter, there are further included one or more circuitry components, e.g., one or more power supply components and/or one or more drive components for supplying and controlling current supplied to one or more light sources. Persons of skill in the art are familiar with a wide variety of ways to supply and control the current supplied to light sources, and any such ways can be employed in the devices of the present inventive subject matter. For example, such circuitry can include at least one contact, at least one leadframe, at least one current regulator, at least one power control, at least one voltage control, at least one boost, at least one capacitor and/or at least one bridge rectifier, persons of skill in the art being familiar with such components and being readily able to design appropriate circuitry to meet whatever current flow characteristics are desired.

In some embodiments in accordance with the present inventive subject matter that comprise a power supply, a power supply can comprise any electronic components that are suitable for a lighting device, for example, any of (1) one or more electrical components employed in converting electrical power (e.g., from AC to DC and/or from one voltage to another voltage), (2) one or more electronic components employed in driving one or more light source, e.g., running one or more light source intermittently and/or adjusting the current supplied to one or more light sources in response to a user command, a detected change in intensity or color of light output, a detected change in an ambient characteristic such as temperature or background light, etc., and/or a signal contained in the input power (e.g., a dimming signal in AC power supplied to the lighting device), etc., (3) one or more circuit boards (e.g., a metal core circuit board) for supporting and/or providing current to any electrical components, and/or (4) one or more wires connecting any components (e.g., connecting an Edison socket to a circuit board), etc., e.g. electronic components such as linear current regulated supplies, pulse width modulated current and/or voltage regulated supplies, bridge rectifiers, transformers, power factor controllers etc.

Many different techniques have been described for driving light sources in many different applications, including, for example, those described in U.S. Pat. No. 3,755,697 to Miller, U.S. Pat. No. 5,345,167 to Hasegawa et al, U.S. Pat. No. 5,736,881 to Ortiz, U.S. Pat. No. 6,150,771 to Perry, U.S. Pat. No. 6,329,760 to Bebenroth, U.S. Pat. No. 6,873,203 to Latham, II et al, U.S. Pat. No. 5,151,679 to Dimmick, U.S. Pat. No. 4,717,868 to Peterson, U.S. Pat. No. 5,175,528 to Choi et al, U.S. Pat. No. 3,787,752 to Delay, U.S. Pat. No. 5,844,377 to Anderson et al, U.S. Pat. No. 6,285,139 to Ghanem, U.S. Pat. No. 6,161,910 to Reisenauer et al, U.S. Pat. No. 4,090,189 to Fisler, U.S. Pat. No. 6,636,003 to Rahm et al, U.S. Pat. No. 7,071,762 to Xu et al, U.S. Pat. No. 6,400,101 to Biebl et al, U.S. Pat. No. 6,586,890 to Min et al, U.S. Pat. No. 6,222,172 to Fossum et al, U.S. Pat. No. 5,912,568 to Kiley, U.S. Pat. No. 6,836,081 to Swanson et al, U.S. Pat. No. 6,987,787 to Mick, U.S. Pat. No. 7,119,498 to Baldwin et al, U.S. Pat. No. 6,747,420 to Barth et al, U.S. Pat. No. 6,808,287 to Lebens et al, U.S. Pat. No. 6,841,947 to Berg-johansen, U.S. Pat. No. 7,202,608 to Robinson et al, U.S. Pat. No. 6,995,518, U.S. Pat. No. 6,724,376, U.S. Pat. No. 7,180,487 to Kamikawa et al, U.S. Pat. No. 6,614,358 to Hutchison et al, U.S. Pat. No. 6,362,578 to Swanson et al, U.S. Pat. No. 5,661,645 to Hochstein, U.S. Pat. No. 6,528, 954 to Lys et al, U.S. Pat. No. 6,340,868 to Lys et al, U.S. Pat. No. 7,038,399 to Lys et al, U.S. Pat. No. 6,577,072 to Saito et al, and U.S. Pat. No. 6,388,393 to Illingworth.

Energy can be supplied to the at least one light source from any source or combination of sources, for example, the grid (e.g., line voltage), one or more batteries, one or more photovoltaic energy collection devices (i.e., a device that includes one or more photovoltaic cells that convert energy from the sun into electrical energy), one or more windmills, etc.

The light source(s) in lighting devices of the present inventive subject matter can be arranged, mounted and supplied with electricity in any suitable manner, and can be mounted on any suitable housing or fixture. Skilled artisans are familiar with a wide variety of arrangements, mounting schemes, power supplying apparatuses, housings and fixtures, and any such arrangements, schemes, apparatuses, housings and fixtures can be employed in connection with the present inventive subject matter. The lighting devices of the present inventive subject matter can be electrically connected (or selectively connected) to any suitable power source, persons of skill in the art being familiar with a variety of such power sources.

As noted above, in some embodiments in accordance with the present inventive subject matter, which can include or not include, as suitable, any of the other features described herein, the lighting device can further comprise a mixing chamber, and/or a housing and/or a fixture (which may, if desired, comprise one or more accessories, e.g., a trim element, a shade, an eyeball trim, etc.). A mixing chamber, and/or a housing and/or a fixture (if included) can generally be of any suitable shape and size, and can be made out of any suitable material or materials. Representative examples of materials that can be used in making a mixing chamber and/or a housing and/or a fixture include, among a wide variety of other materials, extruded aluminum, powder metallurgy formed aluminum, die cast aluminum, liquid crystal polymer, polyphenylene sulfide (PPS), thermoset bulk molded compound or other composite material. In some embodiments that include a mixing chamber element, the mixing chamber element can consist of or can comprise a reflective element (and/or one or more of its surfaces can be reflective). Such reflective elements (and surfaces) are well known and readily available to persons skilled in the art. A representative example of a suitable material out of which a reflective element can be made is a material marketed by Furukawa (a Japanese corporation) under the trademark MCPET®. In some embodiments in accordance with the present inventive subject matter, which can include or not include, as suitable, any of the other features described herein, a housing and/or a fixture (if included) can comprise a material that can be molded and/or shaped, and/or it can comprise a material that is an effective heat sink (i.e., which has high thermal conductivity and/or high heat capacity).

The lighting devices according to the present inventive subject matter can comprise any suitable heat dissipation structures and/or systems, a wide variety of heat dissipation structures and systems being well known to those of skill in the art.

Some embodiments of lighting devices in accordance with the present inventive subject matter (which can include or not include any of the features described elsewhere herein) include one or more lenses, diffusers, obscuration elements or light control elements. Persons of skill in the art are familiar with a wide variety of lenses, diffusers, obscuration elements and light control elements, can readily envision a variety of materials out of which a lens, a diffuser, an obscuration element or a light control element can be made (e.g., polycarbonate materials, acrylic materials, fused silica, polystyrene, etc.), and are familiar with and/or can envision a wide variety of shapes that lenses, diffusers, obscuration elements and light control elements can be. Any of such materials and/or shapes can be employed in a lens and/or a diffuser and/or an obscuration element and/or a light control element in an embodiment that includes a lens and/or a diffuser and/or an obscuration element and/or a light control element. As will be understood by persons skilled in the art, a lens or a diffuser or an obscuration element or a light control element in a lighting device according to the present inventive subject matter can be selected to have any desired effect on incident light (or no effect), such as focusing, diffusing, etc. Any such lens and/or diffuser and/or obscuration element and/or light control element can comprise one or more luminescent materials, e.g., one or more phosphor.

In embodiments in accordance with the present inventive subject matter that include a lens (or plural lenses), the lens (or lenses) can be positioned in any suitable location and orientation.

In embodiments in accordance with the present inventive subject matter that include a diffuser (or plural diffusers), the diffuser (or diffusers) can be positioned in any suitable location and orientation. In some embodiments, which can include or not include any of the features described elsewhere herein, a diffuser can be provided over a top or any other part of a lighting device, and the diffuser can comprise one or more luminescent material (e.g., in particulate form) spread throughout a portion of the diffuser or an entirety of the diffuser.

In embodiments in accordance with the present inventive subject matter that include an obscuration element (or plural obscuration elements), the obscuration element (or obscuration elements) can be positioned in any suitable location and orientation.

In embodiments in accordance with the present inventive subject matter that include a light control element (or plural light control elements), the light control element (or light control elements) can be positioned in any suitable location and orientation. Persons of skill in the art are familiar with a variety of light control elements, and any of such light control elements can be employed.

In some embodiments according to the present inventive subject matter, two or more types of features can be provided in a single element. For example, a single structure can provide light control as well as diffusion and/or obscuration. Typically, where multiple types of features are provided in a single structure, different regions of the structure provide the different features, e.g., regions providing the different features are stacked on one another.

In addition, one or more scattering elements (e.g., layers) can optionally be included in lighting devices according to the present inventive subject matter. For example, a scattering element can be included in a lumiphor, and/or a separate scattering element can be provided. A wide variety of separate scattering elements and combined luminescent and scattering elements are well known to those of skill in the art, and any such elements can be employed in lighting devices in accordance with the present inventive subject matter.

In addition, one or more light output shaping elements can be employed in some embodiments in accordance with the present inventive subject matter, persons of skill in the art being familiar with a variety of suitable light output shaping elements.

The lighting devices according to the present inventive subject matter can further comprise any suitable electrical connector, a wide variety of which are familiar to those of skill in the art, e.g., an Edison connector (for insertion in an Edison socket), a GU24 connector, etc., or may be directly wired to an electrical branch circuit.

Respective light sources or groups of light sources can be electrically connected in any suitable pattern, e.g., in parallel, in series, in series parallel (e.g., in a series of subsets, each subset comprising two or more (e.g., three) light sources arranged in parallel), in a single string or in two or more strings, etc.

In some embodiments of the present inventive subject matter, including some embodiments that include or do not include any of the features as discussed herein, a set of parallel solid state light emitter strings (i.e., two or more strings of solid state light emitters arranged in parallel with each other) is arranged in series with a power line, such that current is supplied through the power line to each of the respective strings of solid state light emitters. The expression "string", as used herein, means that at least two solid state light emitters are electrically connected in series. In some such embodiments, the relative quantities of solid state light emitters that emit light of different respective hues differ from one string to the next, e.g., a first string contains a first percentage of solid state light emitters that emit light within a first hue and/or wavelength range (e.g., dominant wavelength of 400 nm to 480 nm, optionally packaged with luminescent material that emits light of dominant wavelength in a third wavelength range, e.g., 500 nm to 585 nm) and a second percentage of solid state light emitters that emit light within a second hue and/or wavelength range (e.g., dominant wavelength of 600 nm to 640 nm), and a second string contains a third percentage (different from the first percentage) of solid state light emitters that emit light within the first wavelength range and/or hue and a fourth percentage of solid state light emitters that emit light within the second wavelength range and/or hue. As a representative example, first and second strings each contain solely (i.e., 100%) 400 nm to 480 nm dominant wavelength solid state light emitters (optionally packaged with luminescent material that emits light of dominant wavelength in a third wavelength range, e.g., 500 nm to 585 nm), and a third string contains 50% 400 nm to 480 nm dominant wavelength solid state light emitters and 50% 600 nm to 640 nm dominant wavelength solid state light emitters (each of the three strings being electrically connected in parallel to each other and in series with a common power line). By doing so, it is possible to easily adjust the relative intensities of the light of the respective wavelengths, and thereby effectively navigate within the CIE Diagram and/or compensate for other changes. For example, the brightness of red light can be increased, when necessary, in order to compensate for any reduction of the brightness of the light generated by the 600 nm to 640 nm dominant wavelength solid state light emitters. Thus, for instance, in the representative example described above, by increasing or decreasing the current supplied to the third power line, and/or by increasing or decreasing the current supplied to the first power line and/or the second power line (and/or by intermittently interrupting the supply of power to the first power line or the second power line), the x, y coordinates of the mixture of light emitted from the lighting device can be appropriately adjusted.

Some embodiments in accordance with the present inventive subject matter employ one or more current adjuster(s) that adjusts the current supplied to one or more other components, e.g., one or more strings of solid state light emitters. In such embodiments, the current adjuster, when adjusted, adjusts the current supplied to such component(s). For example, in some embodiments, a current adjuster is directly or switchably electrically connected to at least one string of solid state light emitters, and in other embodiments, a plurality of current adjusters are each directly or switchably electrically connected to a respective string of solid state light emitters (or strings of solid state light emitters).

Some embodiments in accordance with the present inventive subject matter employ circuitry by which one or more light sources can be bypassed (permanently or intermittently) to achieve or contribute to color output adjustment.

Persons of skill in the art are familiar with, and have ready access to, a variety of current adjusters, and any of such current adjusters can be employed in embodiments in accordance with the present inventive subject matter.

In some embodiments of the present inventive subject matter, there are further provided one or more switches electrically connected to one or more respective strings of light sources, whereby the switch selectively switches on and off current to the light source(s) on the respective string.

Lighting devices in accordance with the present inventive subject matter can comprise one or more components or circuits to provide dimming. Persons of skill in the art are familiar with a variety of components and combinations of components that can be used in a range of ways to provide dimming, as desired.

Embodiments in accordance with the present inventive subject matter are described herein in detail in order to provide exact features of representative embodiments that are within the overall scope of the present inventive subject matter. The present inventive subject matter should not be understood to be limited to such detail.

FIG. 1 schematically depicts a lighting system 10 in accordance with the present inventive subject matter. Referring to FIG. 1, the lighting system 10 comprises a lighting device 11 and a portable device 12 (which is in a calibration location). The lighting device 11 comprises a plurality of light sources (in the form of packaged LEDs 33, 34 and 35 mounted on a metal core printed circuit board 14), a housing 15, a diffuser 16, a receiver 22, and a heat dissipation element 17 comprising a plurality of heat dissipation fins 18.

The LED 33 and the LED 34 each comprise a light emitting diode (that emits light of a first hue) and luminescent material (that emits light of a second hue, different from the first hue), and the LED 35 comprises a light emitting diode (that emits light of a third hue, different from the first hue and the second hue).

The portable device 12 is a smart phone that comprises a light detector 19, a color point and/or lumen output correction calculator 20 and a color point and/or lumen output correction output element 21. The light detector 19 detects light emitted from the light sources 33, 34 and 35. The color point and/or lumen output correction calculator 20 generates color point and/or lumen output correction signals. The color point and/or lumen output correction output element 21 outputs color point and/or lumen output correction signals to the receiver 22, and the receiver 22 receives color point and/or lumen output correction signals from the color point and/or lumen output correction output element 21.

FIG. 2 schematically depicts a portable device in accordance with the present inventive subject matter, in the form of a portable computing device 23. The portable computing device 23 comprises a light detector 24, a correction calculator 25 and a correction output element 26.

FIG. 3 schematically depicts the first LED 33. The first LED 33 comprises a light emitting diode 36, a lead frame 44 having a reflective surface 45, a copper wire 46, an encapsulant 37, and a lumiphor 38. The lumiphor 38 comprises a luminescent material consisting of QMK58/F-U1 YAG:Ce by Phosphor Teck-UK dispersed in a binder made of Hysol OS400 or GE/Toshiba 5332.

FIG. 4 schematically depicts the third LED 35. The third LED 35 comprises a light emitting diode 39, a lead frame 41 having a reflective surface 42, a copper wire 43, and an encapsulant 40.

FIG. 5 schematically depicts a structure 51 holding the light detector 19 in place relative to the lighting device 11, and in a calibration location 52.

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Below are a series of numbered passages, each of which defines subject matter within the scope of the present inventive subject matter:

Passage 1. A portable device, comprising:
a light detector;
a correction calculator; and
a correction output element.

Passage 2. A portable device as recited in Passage 1, wherein the correction calculator is a color point correction calculator.

Passage 3. A portable device as recited in Passage 1, wherein the correction calculator is a lumen output correction calculator.

Passage 4. A portable device as recited in Passage 1, wherein the correction calculator is a color point and lumen output correction calculator.

Passage 5. A portable device as recited in Passage 1, wherein the correction output element is a color point correction output element.

Passage 6. A portable device as recited in Passage 1, wherein the correction output element is a lumen output correction output element.

Passage 7. A portable device as recited in Passage 1, wherein the correction output element is a color point and lumen output correction output element.

Passage 8. A portable device as recited in Passage 1, wherein the portable device is a smart phone.

Passage 9. A portable device as recited in Passage 1, wherein the portable device is a computing device.

Passage 10. A portable device as recited in Passage 1, wherein the light detector detects a lumen level of at least one color hue.

Passage 11. A portable device as recited in Passage 1, wherein the light detector detects lumen levels of at least two color hues.

Passage 12. A portable device as recited in Passage 1, wherein the light detector sequentially detects lumen levels of at least two color hues.

Passage 13. A portable device as recited in Passage 1, wherein the correction calculator comprises at least one software application.

Passage 14. A portable device as recited in Passage 1, wherein the correction output element outputs a wireless correction signal.

Passage 15. A lighting system, comprising:
a lighting device comprising at least a first light source; and
a portable device that comprises:
a light detector that detects at least light emitted from the first light source;
a correction calculator that generates a correction signal; and
a correction output element that outputs the correction signal to the lighting device.

Passage 16. A lighting system as recited in Passage 15, wherein the portable device is a smart phone.

Passage 17. A lighting system as recited in Passage 15, wherein the portable device is a portable computing device.

Passage 18. A lighting system as recited in Passage 15, wherein the light detector detects a lumen level of at least one color hue.

Passage 19. A lighting system as recited in Passage 15, wherein the light detector detects lumen levels of at least two color hues.

Passage 20. A lighting system as recited in Passage 15, wherein the light detector sequentially detects lumen levels of at least two color hues.

Passage 21. A lighting system as recited in Passage 15, wherein the correction calculator comprises at least one software application.

Passage 22. A lighting system as recited in Passage 15, wherein the correction signal is a wireless signal.

Passage 23. A lighting system as recited in Passage 15, wherein the first light source comprises at least one solid state light emitter.

Passage 24. A lighting system as recited in Passage 15, wherein the first light source comprises at least one light emitting diode.

Passage 25. A lighting system as recited in Passage 15, wherein the lighting device further comprises a receiver that receives the correction signal from the correction output element.

Passage 26. A lighting device comprising:
at least a first light source; and
a receiver that receives a correction signal from a portable device.

Passage 27. A lighting device as recited in Passage 26, wherein the portable device is a smart phone.

Passage 28. A lighting device as recited in Passage 26, wherein the portable device is a portable computing device.

Passage 29. A lighting device as recited in Passage 26, wherein the portable device comprises a light detector that detects a lumen level of at least one color hue.

Passage 30. A lighting device as recited in Passage 26, wherein the portable device comprises a light detector that detects lumen levels of at least two color hues.

Passage 31. A lighting device as recited in Passage 26, wherein the portable device comprises a light detector that sequentially detects lumen levels of at least two color hues.

Passage 32. A lighting device as recited in Passage 26, wherein the portable device comprises a correction calculator that comprises at least one software application.

Passage 33. A lighting device as recited in Passage 26, wherein the correction signal is a wireless signal.

Passage 34. A lighting device as recited in Passage 26, wherein the first light source comprises at least one solid state light emitter.

Passage 35. A lighting device as recited in Passage 26, wherein the first light source comprises at least one light emitting diode.

Passage 36. A method of lighting, comprising:
detecting light emitted from at least a first light source of a lighting device with a light detector of a portable device;
generating a correction signal with a correction calculator of the portable device; and
outputting the correction signal with a correction output element of the portable device.

Passage 37. A method as recited in Passage 36, wherein the correction signal is received by a receiver of the lighting device.

Passage 38. A method as recited in Passage 36, wherein the portable device is a smart phone.

Passage 39. A method as recited in Passage 36, wherein the portable device is a portable computing device.

Passage 40. A method as recited in Passage 36, wherein the light detector detects a lumen level of the first light source of the lighting device.

Passage 41. A method as recited in Passage 36, wherein the light detector detects lumen levels of at least two color hues of light sources of the lighting device.

Passage 42. A method as recited in Passage 36, wherein the light detector sequentially detects lumen levels of at least two color hues of light sources of the lighting device.

Passage 43. A method as recited in Passage 36, wherein the correction calculator comprises at least one software application.

Passage 44. A method as recited in Passage 36, wherein the correction signal is a wireless signal.

Passage 45. A method as recited in Passage 36, wherein the first light source comprises at least one solid state light emitter.

Passage 46. A method as recited in Passage 36, wherein the first light source comprises at least one light emitting diode.

Passage 47. A method of lighting, comprising:
placing a portable device in a calibration location;
illuminating a lighting device comprising at least a first light source;
detecting light emitted from the lighting device with a light detector of the portable device, the portable device having a correction calculator.

Passage 48. A method as recited in Passage 47, wherein light emitted from the lighting device is detected by the light detector during an initial ten hours of illumination of the lighting device.

Passage 49. A method as recited in Passage 47, wherein the method further comprises:
again placing the portable device in the calibration location;
detecting light emitted from the lighting device with the light detector;
performing a correction calculation with the correction calculator to generate a correction signal; and
transmitting the correction signal from a correction output element of the portable device to the lighting device.

Passage 50. A method as recited in Passage 47, wherein the first light source comprises at least one solid state light emitter.

Passage 51. A method as recited in Passage 47, wherein the first light source comprises at least one light emitting diode.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the portable devices, the lighting systems and the lighting devices described herein can be integrated. Any structural part of the lighting systems and the lighting devices described herein can be provided in two or more parts (which may be held together in any known way, e.g., with adhesive, screws, bolts, rivets, staples, etc.). Similarly, any two or more functions can be conducted simultaneously, and/or any function can be conducted in a series of steps.

The invention claimed is:

1. A portable device, comprising:
a light detector;
a correction calculator; and
a correction output element,
the light detector configured to detect at least a first lumen level of light of a first range of at least one hue, the first range of at least one hue comprising only a portion of visible light hues.

2. A portable device as recited in claim 1, wherein the light detector is configured to also detect a second lumen level of a second range of at least one hue, each hue in the second range of at least one hue differing from each hue in the first range of at least one hue.

3. A portable device as recited in claim 1, wherein the correction calculator is configured to calculate at least a first lumen output correction.

4. A portable device as recited in claim 1, wherein the light detector is configured to detect the first lumen level and the second lumen level sequentially.

5. A portable device as recited in claim 1, wherein the correction calculator comprises at least one software application.

6. A portable device as recited in claim 1, wherein the correction output element outputs a wireless correction signal.

7. A portable device as recited in claim 1, wherein the portable device is a smart phone.

8. A lighting system, comprising:
a lighting device comprising at least a first light source; and
a portable device that comprises:
a light detector that detects at least at least a first lumen level of light of a first range of at least one hue emitted from the first light source, the first range of at least one hue comprising only a portion of visible light hues;
a correction calculator that generates a correction signal; and
a correction output element that outputs the correction signal to the lighting device.

9. A lighting system as recited in claim 8, wherein the light detector is configured to also detect a second lumen level of a second range of at least one hue, each hue in the second range of at least one hue differing from each hue in the first range of at least one hue.

10. A lighting system as recited in claim 9, wherein the light detector is configured to detect the first lumen level and the second lumen level sequentially.

11. A lighting device comprising:
   at least a first light source; and
   a receiver that receives a correction signal from a portable device, the correction signal generated at least in part by comparing a first lumen level of light of a first range of at least one hue with a desired lumen level for the first range of at least one hue, the first range of at least one hue comprising only a portion of visible light hues.

12. A lighting device as recited in claim 11, wherein the light detector is configured to also detect a second lumen level of a second range of at least one hue, each hue in the second range of at least one hue differing from each hue in the first range of at least one hue.

13. A lighting device as recited in claim 12, wherein the light detector is configured to detect the first lumen level and the second lumen level sequentially.

14. A method of lighting, comprising:
   detecting at least a first lumen level of a first range of at least one hue of light emitted from at least a first light source of a lighting device with a light detector of a portable device;
   generating a correction signal with a correction calculator of the portable device; and
   outputting the correction signal with a correction output element of the portable device.

15. A method as recited in claim 14, wherein the method further comprises detecting a second lumen level of a second range of at least one hue of light emitted from the first light source with the light detector, each hue in the second range of at least one hue differing from each hue in the first range of at least one hue.

16. A method as recited in claim 15, wherein the detecting a first lumen level and the detecting a second lumen level are occur sequentially.

17. A method of lighting, comprising:
   placing a portable device in a calibration location;
   illuminating a lighting device comprising at least a first light source;
   detecting light emitted from the lighting device with a light detector of the portable device during an initial ten hours of illumination of the lighting device, the portable device having a correction calculator,
   again placing the portable device in the calibration location after the initial ten hours of illumination of the lighting device;
   detecting light emitted from the lighting device with the light detector after the initial ten hours of illumination of the lighting device;
   performing a correction calculation with the correction calculator to generate a correction signal based at least in part on comparing the light detected during the initial ten hours of illumination with the light detected after the initial ten hours of illumination; and
   transmitting the correction signal from a correction output element of the portable device to the lighting device.

18. A method as recited in claim 17, wherein the method comprises detecting a first lumen level of a first range of at least one hue of light emitted from the lighting device during the initial ten hours of illumination of the lighting device and detecting a second lumen level of the first range of at least one hue of light emitted from the lighting device after the initial ten hours of illumination of the lighting device.

19. A method as recited in claim 18, wherein the method comprises detecting a first lumen level of a second range of at least one hue of light emitted from the lighting device during the initial ten hours of illumination of the lighting device and detecting a second lumen level of the second range of at least one hue of light emitted from the lighting device after the initial ten hours of illumination of the lighting device.

20. A portable device comprising
   a light detector;
   a correction calculator; and
   a correction output element,
   the correction calculator configured to calculate a correction based on a difference between (1) a first lumen level of light of a first range of at least one hue detected by the light detector and (2) a second lumen level of light of the first range of at least one hue.

21. A portable device as recited in claim 20, wherein the second lumen level of light of the first range of at least one hue is detected at a calibration location.

22. A portable device as recited in claim 20, wherein the first and second lumen levels of light of the first range of at least one hue are determined by the portable device based on light output from a lighting device at two different times.

23. A portable device as recited in claim 20, wherein the second lumen level of light of the first range of at least one hue is determined by the portable device based on light output from a lighting device during a first 10 hours of illumination of the lighting device.

24. A portable device as recited in claim 20, wherein the second lumen level of light of the first range of at least one hue is determined by the portable device based on light output from a reference light.

* * * * *

UNITED STATES PATENT AND TRADEMARK OFFICE
CERTIFICATE OF CORRECTION

PATENT NO. : 9,554,445 B2  
APPLICATION NO. : 13/723952  
DATED : January 24, 2017  
INVENTOR(S) : Joseph P. Chobot Page 1 of 1

It is certified that error appears in the above-identified patent and that said Letters Patent is hereby corrected as shown below:

In the Claims

Column 30, Line 41, Claim 4:
Please change: "A portable device as recited in claim 1, wherein the" to -- A portable device as recited in claim 2, wherein the --

Column 30, Line 56, Claim 8:
Please change: "a light detector that detects at least at least a first lumen" to -- a light detector that detects at least a first lumen --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*